July 4, 1961 J. W. THROCKMORTON ET AL Re. 25,006

VERTICAL TUBE HEATERS

Original Filed Feb. 2, 1955 2 Sheets-Sheet 1

INVENTORS
JOHN W. THROCKMORTON
JOHN S. WALLIS
BY
ATTORNEY

VERTICAL TUBE HEATERS

Original Filed Feb. 2, 1955 2 Sheets-Sheet 2

INVENTORS
JOHN W. THROCKMORTON
JOHN S. WALLIS
BY
ATTORNEY

United States Patent Office

Re. 25,006
Reissued July 4, 1961

25,006
VERTICAL TUBE HEATERS

John W. Throckmorton and John Samuel Wallis, New York, N.Y., assignors, by mesne assignments, to Yuba Consolidated Industries, Inc., San Francisco, Calif., a corporation of Delaware Original No. 2,818,838, dated Jan. 7, 1958, Ser. No. 485,631, Feb. 2, 1955. Application for reissue Oct. 8, 1959, Ser. No. 845,297
8 Claims. (Cl. 122—356)

Matter enclosed in heavy brackets [ ] appears in the original patent but forms no part of this reissue specification; matter printed in italics indicates the additions made by reissue.

This invention relates to a heater of the vertical tube type which is particularly well adapted for use in oil heating processes.

One object is to provide such a heater which is simple in design and economical to construct.

Another object is to effectively use the heat from one or more burners located at the bottom of the heater within a single cylindrical bank of tubes and arranged to discharge the hot gases of combustion upward within the hollow cylinder formed by the tubes.

Another object is to divide the heater into a lower radiant zone and an upper convection zone by means of a cylindrical baffle which forms a narrow annulus at the top of the heater, thereby increasing the velocity of the hot gases in the convection zone.

The baffle is conical at the bottom and gradually diverts the hot gases towards the tubes as they approach the convection zone whereas the hot flames and gases from the burners do not impinge against the tubes in the lower part of the furnace but impart heat thereto by radiation in a highly efficient manner.

The tubes have smooth external surfaces in the radiant zone but are provided with integral fins or extended surface elements in the convection zone so that a large surface is exposed to direct contact with the hot gases after they have given up substantial quantities of heat by radiation and are at a lower temperature than in the lower radiant zone of the heater.

Another object is to subdivide the vertical tubes into a plurality of arcuate coils, each coil composed of an inlet tube on one side of the heater and an outlet tube on the opposite side of the heater, and each coil having one or more interconnecting jumpers at the top of the heater whereby all of the inlet tubes are adjacent to one another at one side of the heater and all of the outlet tubes are adjacent to one another at the opposite side of the heater.

By this expedient all of the feed pipes are located at the bottom of the furnace on one side and all of the exit pipes are located at the bottom of the furnace on the opposite side. All of the usual measuring instruments and control devices for the feed streams may thus be located close together near the foundation of the furnace. Likewise all of the usual measuring instruments and control devices for the outgoing streams are also close together near the foundation of the furnace. Thus all the necessary instruments and control devices may be located either on one side or the other side of the furnace, regardless of the number of passes or individual coils employed in the heater.

This arrangement also provides the important advantage that necessary interconnections for each coil between the inlet tube, the intermediate tubes of which it is composed, and the outlet tube are relatively short and direct and are all located at the top of the heater within the path of the hot gases.

In multi-pass furnaces as hitherto constructed and arranged the manifolding of the several passes and the connection of the end coils to the intake and exit pipes are carried outside of the furnace, and particularly in large heaters this involves the use of heavy and costly metal jumpers and connectors which present a problem of expansion as well as loss of heat, occupy a great deal of space and require expensive insulation. All of these disadvantages and difficulties are obviated by the use of this invention.

Another object of this invention is to provide a vertical tube heater in which the following features are combined and vitally cooperate to bring about the desired result, viz.:

(a) A single bank of vertical tubes adapted to be used in a large cylindrical furnace with a central axial flame to which the tubes are exposed and by which they are heated primarily by radiation.

(b) The tubes are divided into a plurality of arcuate banks constituting individual coils.

(c) Each individual coil has an inlet tube and an outlet tube.

(d) The inlet tubes, which for example may be four, six or eight in number depending on the number of arcuate banks or coils into which the heater is divided, are located adjacent to each other on one side of the furnace.

(e) The outlet tubes are likewise adjacent to each other and are located at the opposite side of the furnace.

(f) Interconnecting jumpers are used only at the top of the heater and are so disposed that they are bathed in the exit gases from the furnace. They are short and direct and connect each arcuate bank or coil to its respective inlet or outlet tubes in a uniform pattern.

Referring to the drawings,

FIG. 2 illustrates the connections for a four-pass flow;
FIG. 5 shows the connections for a six-pass flow, and
FIG. 6 shows the connections for an eight-pass flow.

Figure 1:
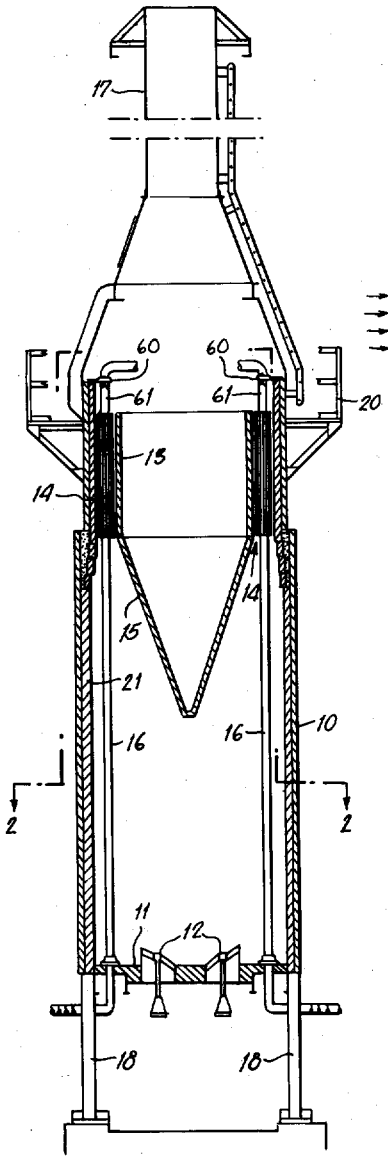
FIG. 1 is a sectional elevation of a vertical tube radiant-convection heater embodying the invention.
Figure 2:
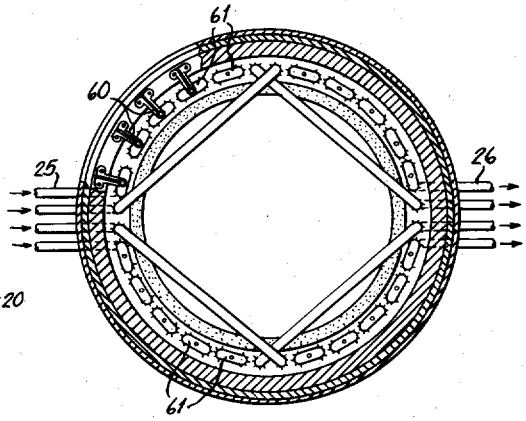
FIG. 2 is a cross-section on the line 2—2 of FIG. 1.

In FIGS. 1 and 2 the radiant-convection vertical tube heater here shown comprises a cylindrical furnace shell 10, a bottom wall 11 in which are upshot burners 12, a cylindrical baffle 13 forming a narrow annular passage 14, which constitutes the convection section of the heater, a conical baffle 15 which depends from the cylindrical baffle 13 and is completely closed so that flue gases must pass upward through the convection section 14, a cylindrical bank of heat transfer tubes 16, which are supported by the bottom plate 11 and each of which has a smooth outer surface throughout the entire length of the radiant section of the furnace and fins or other extended surface elements welded or formed integral with the tube in the convection section.

Figure 3:
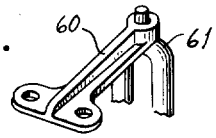
FIG. 3 is a perspective view of a tube support.

As shown in FIG. 1 the tubes 16 extend upward beyond the top of the annular passage 14 and they are supported by brackets 60 as shown in FIG. 3, which are fastened to the shell 10 and project inwardly and are attached to the return bends 61 but do not interfere with the free flow of the flue gases which pass upwardly, bathe the return bends and the jumpers 27 and 28, which are straight and short and are located above the baffle as shown in FIG. 2, and up the stack.

Figure 4:
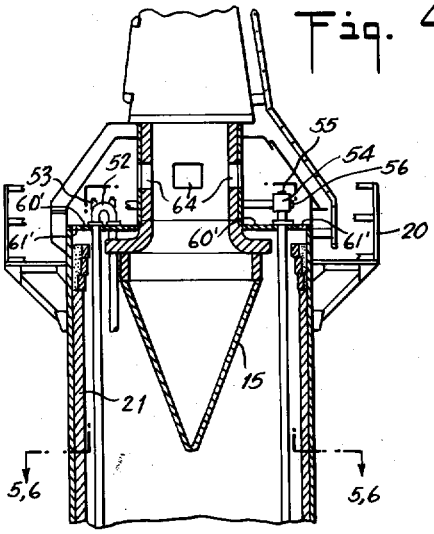
FIG. 4 is a view showing a portion of a vertical tube radiant heater corresponding to the upper portion of FIG. 1, in which the tubes of each arcuate coil are interconnected to each other by return bends and to inlet and outlet tubes of the coil by jumpers and junction boxes provided with clean-out plugs.
Figure 5:
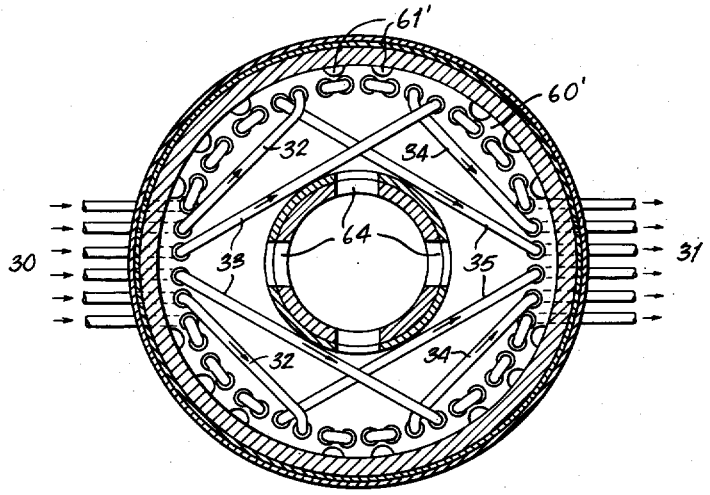
FIG. 5 is a cross-section taken on the line 5—5 of FIG. 4.

As shown in FIGS. 4 and 5 the furnace gases all pass upward through the perforations 61' in the tube sheet 60' and enter the stack through openings 64.

It is an important advantage of this invention that the jumpers are not only short and direct but also bathed with furnace gases and so are kept warm and not subject to undue expansion or contraction, which factors have always been troublesome when the jumpers are outside the furnace as has hitherto been the practice. This condition is greatly magnified in vertical tube heaters of very large size and it is not unusual for the heaters to have a diameter of 30 ft.

A stack 17 is mounted at the upper end of the heater. The entire structure is supported on legs 18 so that the bottom wall 11 of the heater is elevated above the foundation sufficiently to enable the attendants to walk beneath and inspect the burners. A gallery 20 may be mounted on the furnace near the upper end of the tubes so that the cross-over connections may be inspected, or heat transfer tubes replaced if necessary.

The structure illustrated in FIG. 4 differs from that shown in FIG. 1 in that there is no convection section and no cylindrical baffle, although the conical baffle 15 is spaced downward from the throat.

The tubes in this modification instead of being welded to each other and to the manifolds are interconnected by return bends 52, having clean-out plugs 53, and the tubes are connected to the jumpers by junction boxes 54, which have clean-out plugs 55 on the top opposite the vertical tubes with clean-out plugs 56 on the side opposite the jumper to which the tube is connected.

It will be understood that the radiant convection type of heater shown in FIG. 1 may have the provision for cleaning the tubes as shown in FIG. 4, and on the other hand, the radiant type of heater of FIG. 4 may have welded connections, as shown in FIG. 1, depending on the service for which the heater is intended.

Figure 6:
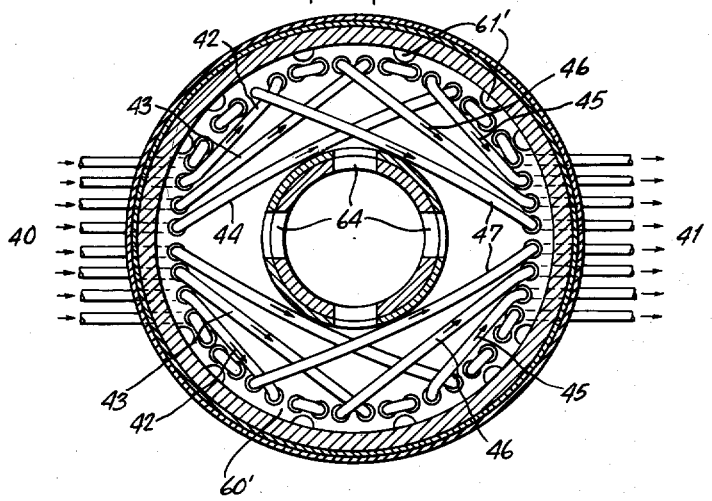
FIG. 6 is a cross-section taken on the line 6—6 of FIG. 4 showing an alternative arrangement of connections.

The connections which establish either the four, six or eight-pass flow, as illustrated in FIGS. 2, 5 and 6, may be employed with the radiant-convection type of heater shown in FIG. 1, or with the radiant type of heater shown in FIG. 4. The furnace shell has a lining 21 of heat resisting material, such as refractory brick, which will reflect heat from the furnace wall back on to the outer surfaces of the heat transfer tubes.

The radiant section of the heater is usually tall relative to the diameter and the hotflame and gases from the burners proceed upwardly and within the circular tube bank and very efficiently transfer heat by radiation to the tubes.

After the gases have become somewhat cooled as they have given up heat to the tubes in the radiant section, they are deflected outwardly against the tubes by the conical baffle 15 and then flow with increased velocity caused by the relatively narrow annular passage, through the convection section where they are forced into contact with the fins or extended surface elements of the tubes.

In commercial use the heaters vary greatly in size and capacity and the diameter of the heater may be as great as 30 ft. and the height as great as 90 ft., exclusive of the stack.

One of the important features of the invention is to arrange a novel and effective series of manifold connections whereby the heater elements may be divided into separate groups and connected in parallel flow, while at the same time permitting all of the inlet connections to be located close together on one side of the heater near the bottom and the outlet connections located in another group at the opposite side of the heater while maintaining the uniform distribution of tubes throughout the circular tube bank, and at the same time avoiding overheating the connecting pipes.

This is accomplished in the four-pass arrangement of

FIG. 2 where 25 indicates the four inlet pipes and 26 the four outlet pipes, which, as shown in FIG. 1, are located below the furnace floor 11 and extend outwardly where they can be readily connected to the piping of the system, in which the heater is employed.

The upper ends of the tubes above the convection section are appropriately interconnected by jumper tubes 27 and 28, the arrows in FIG. 2 indicating the direction of flow of the fluid being heated. It is an important feature of the invention that the jumper tubes are straight, pass through the cylindrical path as shown in FIG. 2, or around it as shown in FIGS. 5 and 6, but always in the path of the furnace gases, because this construction is much less costly and cumbersome than inter-connecting means hitherto employed. The saving is particularly outstanding when the heaters are very large, a heater of 30 ft. in diameter and having tubes of 5 or 6 inches, or even larger diameter, being usual in commercial structures.

Referring to FIG. 5, the six-pass flow is similarly provided with inlets 30 and outlets 31 at the bottom of the heater in the same location as shown for the inlets 25 and outlets 26 in FIG. 1. Jumpers in this case are 32 and 33, and 34 and 35.

In the eight-pass flow in the arrangement of FIG. 6, there are eight inlets 40 and eight outlets 41 located at the bottom of the furnace corresponding to the inlets 25 and outlets 26 of FIG. 1, and in this case jumpers 42, 43 and 44 and jumpers 45, 46 and 47 are employed.

One of the important advantages of the arrangement shown and described becomes apparent from an examination of FIGS. 2, 5 and 6, which clearly show the symmetry of the manifolding for each of the groups of tubes. This reduces the number of different jumpers to be made and also insures that each of the multi-flow paths of the heater are substantially alike in length and hence are uniform in pressure drop and facilitate uniform distribution of the fluid or feed stock as it is fed into the furnace tubes to be heated.

Another advantage of the arrangement shown and described which is particularly important in large size heaters arises from the fact that all of the inlet connections for the multi-pass heaters are located close together below the furnace floor at one side and hence flow control or other instruments at the inlets can be located on a single control board at this location, rather than being spaced around the heater as has been the practice prior to this invention. Likewise, all the temperature or other control instruments which are associated with the outlets of the heater may be concentrated at another handy location on the other side of the heater.

This application is a continuation-in-part of our copending application Ser. No. 409,952, filed February 12, 1954, now abandoned, for Vertical Tube Heaters.

Other embodiments of the invention will suggest themselves to those skilled in the art and only such limitations are intended as are indicated in the appended claims.

What we claim:

1. A tubular heater comprising a tall cylindrical furnace chamber, a single cylindrical bank of vertical tubes within the furnace chamber close to the inner wall thereof, means for connecting the tubes into a plurality [of] *consisting of not less than four* arcuate coils *having a substantially equal number of tubes* uniformly distributed within the furnace chamber, each of said coils being composed of an inlet tube and an outlet tube, said inlet tubes being [adjacent to each other] *located side by side* on one side of the furnace and having inlet connections thereto at the bottom of the furnace and said outlet tubes being [adjacent to each other and] located *side by side* on the opposite side of the furnace and having outlet connections thereto at the bottom of the furnace, one or more burners centrally located at the bottom of the chamber and projecting flame upwardly within the center of the cylindrical tube bank, whereby heat is applied to all of the tubes by radiation, and [symmetrical] jumpers at the top of the furnace in the path of the exit gases connecting each arcuate coil to at least one of its inlet and outlet tubes.

2. A claim according to claim 1 in which the tubes are connected into four equal arcuate banks and [uniformly] interconnected by jumpers at the top.

3. A claim according to claim 1 in which the tubes are connected into six equal arcuate banks and [uniformly] interconnected by jumpers at the top.

4. A claim according to claim 1 in which the tubes are connected into eight equal arcuate banks and [uniformly] interconnected by jumpers at the top.

5. A vertical tube heater comprising a hollow cylindrical combustion chamber, a stack projecting above the chamber at the top, a single circular bank of tubes near the inner wall of the chamber and return bends interconnecting said tubes into a plurality [of] *consisting of not less than four* arcuate coil banks *having a substantially equal number of tubes,* a closed conical baffle suspended apex down in the top of the chamber to form an annular opening through which the upper ends of the tubes extend, one or more burners centrally located in the bottom of the heater and projecting flame upwardly along the axis of the chamber to impart radiant heat to the tubes, each of said coils being composed of an inlet tube and an outlet tube, said inlet tubes being *immediately* adjacent to each other on one side of the furnace and having inlet connections thereto at the bottom of the furnace and said outlet tubes being *immediately* adjacent to each other and located on the opposite side of the furnace and having outlet connections thereto at the bottom of the furnace, and symmetrical jumpers at the top of the furnace above the conical baffle in the path of the exit gases connecting each arcuate coil to such of its inlet and outlet tubes as are circumferentially spaced from the body of the coil.

6. A claim according to claim 5 in which the tubes are connected into four equal arcuate banks and uniformly interconnected by jumpers at the top.

7. A claim according to claim 5 in which the tubes are connected into six equal arcuate banks and uniformly interconnected by jumpers at the top.

8. A claim according to claim 5 in which the tubes are connected into eight equal arcuate banks and uniformly interconnected by jumpers at the top.

References Cited in the file of this patent or the original patent

UNITED STATES PATENTS

| | | |
|---|---|---|
| 2,229,253 | Nash | Jan. 21, 1941 |
| 2,333,077 | Wallis et al. | Oct. 26, 1943 |
| 2,385,749 | Wallis et al. | Sept. 25, 1945 |
| 2,505,696 | Villiger | Apr. 25, 1950 |
| 2,688,589 | Campbell | Sept. 7, 1954 |